US009665776B2

(12) United States Patent
Kleihorst et al.

(10) Patent No.: US 9,665,776 B2
(45) Date of Patent: May 30, 2017

(54) SYSTEM AND METHOD FOR 2D OCCUPANCY SENSING

(75) Inventors: Richard Kleihorst, Kasterlee (BE); Bart Michiels, Turnhout (BE)

(73) Assignee: VITO NV, Mol (BE)

( * ) Notice: Subject to any disclaimer, the term of this patent is extended or adjusted under 35 U.S.C. 154(b) by 588 days.

(21) Appl. No.: 13/576,237

(22) PCT Filed: Sep. 28, 2010

(86) PCT No.: PCT/EP2010/064328
§ 371 (c)(1),
(2), (4) Date: Jul. 31, 2012

(87) PCT Pub. No.: WO2011/091868
PCT Pub. Date: Aug. 4, 2011

(65) Prior Publication Data
US 2012/0314081 A1     Dec. 13, 2012

(30) Foreign Application Priority Data

Feb. 1, 2010   (EP) ..................................... 10152277

(51) Int. Cl.
*H04N 7/18*      (2006.01)
*G06K 9/00*      (2006.01)
(Continued)

(52) U.S. Cl.
CPC ..... *G06K 9/00771* (2013.01); *G06K 9/00979* (2013.01); *G06K 9/629* (2013.01);
(Continued)

(58) Field of Classification Search
CPC ...................................................... H04N 7/181
(Continued)

(56) References Cited

U.S. PATENT DOCUMENTS 5,786,804 A * 7/1998 Gordon ................. G06F 3/0317
345/158
2004/0212678 A1* 10/2004 Cooper ............ G08B 13/19602
348/155

(Continued)

FOREIGN PATENT DOCUMENTS

WO        03/049430 A2    6/2003

OTHER PUBLICATIONS

International Search Report and Written Opinion for PCT/EP2010/064328, Dec. 2, 2010.
(Continued)

*Primary Examiner* — Jefferey Harold
*Assistant Examiner* — Humam Satti
(74) *Attorney, Agent, or Firm* — Bacon & Thomas, PLLC (57) ABSTRACT

A 2D occupancy system for determining a position of a user (e.g. a human, an object or an animal) in an environment includes a host device and a plurality of motion detection devices. The host device and the plurality of motion detection devices are connected through a network. Each motion detection device has a viewing angle and the viewing angle of any motion detection device overlaps with the viewing angle of at least one other motion detection device. The host device comprises an input port for receiving motion information from the plurality of motion detection devices, and a processing unit for determining the position of the user in the environment from the motion information from particular motion detection devices at a same time-stamp.

12 Claims, 7 Drawing Sheets

(51) Int. Cl.
    *G06K 9/62*         (2006.01)
    *G06T 7/20*         (2017.01)
    *G08B 13/196*     (2006.01)

(52) U.S. Cl.
    CPC ...... *G06T 7/2093* (2013.01); *G08B 13/19608* (2013.01); *G08B 13/19641* (2013.01); *H04N 7/181* (2013.01); *G06T 2207/10048* (2013.01); *G06T 2207/30232* (2013.01); *G06T 2207/30241* (2013.01)

(58) Field of Classification Search
    USPC ..... 348/61, 142, 143, 149, 152–159, 208.14
    See application file for complete search history.

(56) References Cited

U.S. PATENT DOCUMENTS

| | | | |
|---|---|---|---|
| 2004/0263625 A1* | 12/2004 | Ishigami | G08B 13/19608 348/152 |
| 2005/0078852 A1* | 4/2005 | Buehler | G06T 7/0004 382/103 |
| 2005/0265582 A1* | 12/2005 | Buehler | G06K 9/00335 382/103 |
| 2006/0238616 A1* | 10/2006 | Curtner et al. | 348/143 |
| 2007/0252814 A1* | 11/2007 | Lin | G06F 3/0317 345/158 |
| 2007/0257986 A1* | 11/2007 | Ivanov | G08B 13/19671 348/154 |
| 2008/0024390 A1* | 1/2008 | Baker | G06T 3/4053 345/1.3 |
| 2009/0316624 A1 | 12/2009 | Van Der Wateren | |

OTHER PUBLICATIONS

Written Opinion of the International Preliminary Authority for PCT/EP2010/064328, May 29, 2012.
International Search Report received in PCT/EP2010/064328, dated Dec. 2, 2010.
Trevor Ahmedali, et al, "Collaborative Multi-Camera Surveillance with Automated Person Detection", Computer and Robot Vision, Proceedings of the 3rd Canadian Conference on Computer and Robot Vision, Jun. 7, 2006, pp. 39-46.
Nicola Bellotto, et al, "A Distributed Camera System for Multi-Resolution Surveillance", IEEE, 2009, University of Oxford, United Kingdom.
Stephan Hengstler, et al, "Application-Oriented Design of Smart Camera Networks", Wireless Sensor Networks Lab, Department of Electrical Engineering, IEEE, 2007, pp. 12-19, Stanford University, Stanford, CA.
Stephan Hengstler, et al, "Mesh-Eye: A Hybrid-Resolution Smart Camera Mote for Applications in Distributed Intelligent Surveillance", Wireless Sensor Networks Lab, Department of Electrical Engineering, pp. 360-369, Stanford University, Stanford, CA, 2007.
Alexandra Koutsia, et al, "Intelligent Traffic Monitoring and Surveillance with Multiple Cameras", Content-Based Multimedia Indexing, IEEE, Jun. 18, 2008, pp. 125-132.
Morbee et al.,"Optimal Camera Selection in Vision Networks through Shape Approximation", Ghent University, Sint-Pietersnieuwstraat 41, 9000 Gent, Belgium & Wireless Sensor Network Lab, Department of Electrical Engineering, Stanford University, Stanford, California, 94305, USA, Oct. 2008.

* cited by examiner

SYSTEM AND METHOD FOR 2D OCCUPANCY SENSING

FIELD OF THE INVENTION

The invention relates generally to sensor networks, and in particular to visual sensor networks for event detection. In particular embodiments, the present invention relates to modeling traffic of objects with sensor networks.

BACKGROUND OF THE INVENTION

Occupancy sensing means detecting whether persons or objects are present in a space. Typical known examples of occupancy sensing are automatic doors that open and outside light fixtures that switch on when a person is walking by. For both purposes a PIR (passive infrared) sensor, often combined with a "radar" diode is used. Sometimes pressure sensitive carpets or interrupts of light beams are used.

In more processing intensive methods, cameras may be used to detect persons, for example for applications like border control and pedestrian detection.

Current day 1D occupancy systems cannot give a proper 2D overview of the scene. Only camera-based methods can have some slight sense of the 2D position of the person based on height, ground-plane position and detection angle. A PIR based sensor for instance detects only that something is within its range.

The systems that are proposed in research and innovative installations for 2D occupancy sensing are based on multi-camera setup, radar, ultrasound, radio beacons or pressure sensitive carpets. The pressure sensitive carpet setup and camera setup are difficult to employ because of expensive alterations on the infrastructure and wiring for power and data lines.

In a true 2D occupancy system, the 2D positions of persons or objects in the space are reported. They can be drawn on a geographic plan of the scene, alleviating bothering the operator with video images, and being much more understandable for an intermediate user.

A camera-based method can use a camera mounted on the ceiling with wide-angle viewing lenses, with background subtraction and foreground detection in order to obtain the number and location of persons. A ceiling based camera gives challenges in the processing of the signal because of the huge distortion of the wide viewing angle lens that is necessary in order to capture an entire room. Also further analysis of the images, such as face recognition, if so desired, will then need additional cameras in the horizontal plane.

Figure 1:
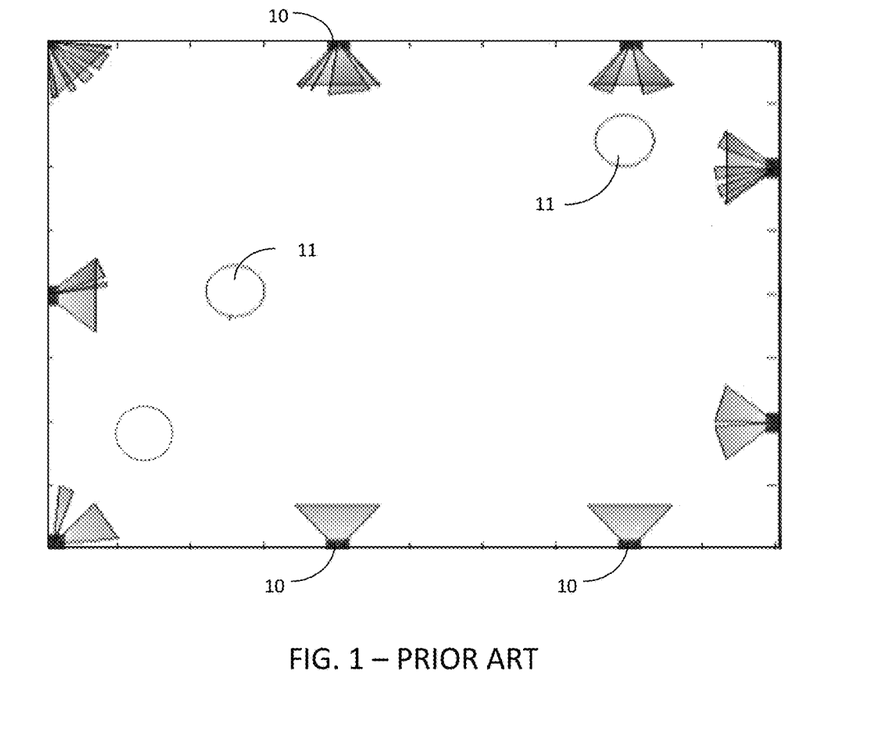
FIG. 1 schematically illustrates a prior art 2D occupancy sensing system making use of cameras and performing background/foreground discrimination in order to distinguish persons from the ambient.

A system that uses multiple cameras in the horizontal plane that work together to create a 2D occupancy system is described by M. Morbee, L. Tessens, H. Lee, W. Philips, and H. Aghajan in "Optimal camera selection in vision networks for shape approximation", Proceedings of IEEE International Workshop on Multimedia Signal Processing (MMSP), Cairns, Queensland, Australia, October 2008, pp. 46-51. Such system is illustrated schematically in FIG. 1, showing a top view of the scene which shows its geometry and the positions of the cameras 10 and persons 11. The system does background-foreground segmentation and shares "active" angles (angle ranges where objects are detected) between the cameras in order to create an occupancy map. An added benefit of this method is that if necessary, also facial views are available in the system.

Camera based systems suffer from possible privacy breach, which is halting the progression into private enterprises and elderly homes.

Occupancy systems give only input to final applications, this means that in economical sense the price has to be far below the cost reductions that can be achieved in the main application by using them. This puts a heavy burden on the bill of materials of the complete sensor system. Regular cameras are usually too expensive because of the high processing involved to analyse real-time video signals. Also their power consumption is too high to make battery operation practically feasible needing hookup to grid power or power over Ethernet, which means expensive changes to the infrastructure.

Both ultra sound and radar technologies need extensive noise cancellation techniques and heavy processing because of the use of direction of arrival methods.

For a sensor based occupancy system to be successful, it needs to be ultra cheap and very low-power.

SUMMARY OF THE INVENTION

It is an object of embodiments of the present invention to provide a 2D occupancy method and system which alleviates at least some of the problems encountered with prior art methods and systems.

The above objective is accomplished by devices and methods according to embodiments of the present invention.

In a first aspect, the present invention provides a 2D occupancy system for determining a position of a user (e.g. a human, an object or an animal) in an environment. The system comprises a host device and a plurality of event detection devices, e.g. at least three event detection devices, the host device and the plurality of event detection devices being connected through a network. A system according to embodiments of the present invention comprises at least two event detection devices; with three or more event detection devices the results are significantly better. At least one of the plurality of event detection devices is a low resolution detection device with a resolution of about 4000 pixels in total or below, e.g. 1000 pixels in total or below, 512 pixels in total or below, down to 25 pixels or below, 20 pixels or below, 16 pixels or below, even down to 8 pixels or even 1 pixel. The bottom limit on the number of pixels in an event detection device according to embodiments of the present invention is 1. Each event detection device has a viewing angle and the viewing angle of any event detection device overlaps with the viewing angle of at least one other event detection device. The host device comprises an input port for receiving event information related to the presence of users in the environment from the plurality of event detection devices, and a processing unit for determining the position of the user in the environment from the event information from particular event detection devices at a same time-stamp.

In particular embodiments of the present invention, at least one of the plurality of event detection devices may be adapted for delivering an event detection signal, e.g. a Boolean event detection signal, to the host device.

In particular embodiments of the present invention, the event information received from the plurality of event detection devices may be time-stamped by the event detection devices. In alternative embodiments, the event information from the plurality of detection devices gets a time-stamp when received by the host.

In a 2D occupancy system according to embodiments of the present invention, the processing unit may be further adapted for determining a track of one or more moving users by analyzing a migration of the event information from the plurality of event detection devices.

In a 2D occupancy system according to embodiments of the present invention, the network may be wired or wireless or may include both wired and wireless event detection devices.

In a 2D occupancy system according to embodiments of the present invention, an event detection device may comprise an array of photosensors, e.g. a 2D array, for forming low-resolution frames of less than 4000 pixels, a storage unit connected to said array for storing a reference frame of pixel values in which each pixel value is indicative of light energy received at a particular photosensor at a specific time, correlation means connected to said array and to said storage unit for correlating an arrangement of said pixel values of said reference frame with at least one sample frame of pixel values formed in response to light energy received at said array subsequent to said specific time; and computing means, responsive to detection of correlations by said correlation means, for generating an attitudinal signal representing optical flow of pixel values of said at least one sample frame relative to said pixel values of said reference frame, said attitudinal signal thereby representing movement of the user in the environment.

In a second aspect, the present invention provides a method for determining 2D occupancy of an environment by a user. A method according to embodiments of the present invention comprises detecting an event related to presence of users in the environment by means of at least one of a plurality of event detection devices, at least one of the plurality of event detection devices being a low resolution detection device with a resolution of about 4000 pixels in total or below, each event detection device having a viewing angle and the viewing angle of any event detection device overlapping with the viewing angle of at least one other event detection device; labeling the event according to each event detection device that detected the event and the time of the event; and determining the position of the user in the environment from the labeled event. The labeling may take place at the level of the event detection device observing the event, or at the level of a host receiving the event information from the event detection device.

It is advantageous that the image processing method according to embodiments of the present invention, having overlapping views works on sole global "event" detection and dividing the space in addressable regions according to the event detections. The events detected can for example be motion, if the event detection device is a motion detection device. It is to be noted that, according to embodiments of the present invention, also the measurement of "no motion" is taken into account to address the polygon. This is different from prior art methods which are only interested in the parts where motion is detected and throw away the information of parts where no motion is detected. In alternative embodiments, an event detected can for example be a temperature increase in case the event detection device is a temperature sensor or IR sensor. Temperature increase is an event which may indicate that a user such as for example a living being or a heat radiating object such as a robot or a machine is within the detection reach of the event detection device. On top of the temperature event detection, also motion information (the migration of temperature event detection over different event detection devices) may be taken into account to discriminate between an actual user being present and other heating sources being detected.

In a method according to embodiments of the present invention, determining the position of the user in the environment from the labeled events may comprise grouping labeled events having a similar timestamp corresponding to the time of the event, and using such group of labeled events as an address on a 2D overview of the environment.

A method according to embodiments of the present invention may furthermore comprise determining a track of a moving user by analyzing a migration of event observations by different event sensing devices. The track of the moving user may be visualized on a map of the environment. In a method according to embodiments of the present invention, each of the event detection devices may have a viewing cone spanning part of the environment, the viewing cones of the event detection devices dividing the observed environment into regions, and determining the position of the user in the environment may comprise determining vertex crossing between regions. Determining vertex crossing between regions may include using a look-up table relating addresses of regions to position coordinates in the environment.

The above-described method embodiments of the present invention may be implemented in a processing system including at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information, e.g. on viewing angles of event detection devices. Ports for inputting and outputting data also may be included, for example a port for outputting the 2D occupancy information of a user in an environment and displaying this on a map of the environment. More elements such as network connections, interfaces to various devices, and so forth, may be included, but are not detailed here. The various elements of the processing system may be coupled in various ways, including via a bus subsystem. The memory of the memory subsystem may at some time hold part or all of a set of instructions that when executed on the processing system implement the steps of the method embodiments described herein. Thus, while a processing system in general is prior art, a processing system that includes the instructions to implement aspects of the methods for obtaining information for determining 2D occupancy of a user in an environment is not prior art.

In a further aspect, the present invention provides the use of a method according to embodiments of the second aspect of the present invention for modeling of traffic of users in an environment.

In yet another aspect, the present invention provides a computer program product for providing the functionality of any of the method embodiments of the second aspect of the present invention when executed on a computing device associated with a 2D occupancy system.

Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The drawings are only schematic and are non-limiting. In the drawings, the size of some of the elements may be exaggerated and not drawn on scale for illustrative purposes.

Any reference signs in the claims shall not be construed as limiting the scope of the present invention.

In the different drawings, the same reference signs refer to the same or analogous elements.

DETAILED DESCRIPTION OF ILLUSTRATIVE EMBODIMENTS

The present invention relates to 2D occupancy sensing. 2D occupancy sensing is, in view of its complexity, at this moment only found in research domains, but it could have huge applications in surveillance, elderly care, environment discovery, traffic flow monitoring, smart buildings, agriculture etc.; everywhere where numerical information about the number and position of users, e.g. living beings such as people or animals, or objects, e.g. heat radiating objects, such as for example robots or machines, in a space may be used to control a system.

In one aspect, the present invention provides a 2D occupancy system for determining a position of a user in an environment. In an example application, the environment may be a room. In alternative applications, the environment may for example be a corridor, a garage, or similar space. The environment may even be a an outside location such as a square, a meadow, a garden etc.

Figure 2:
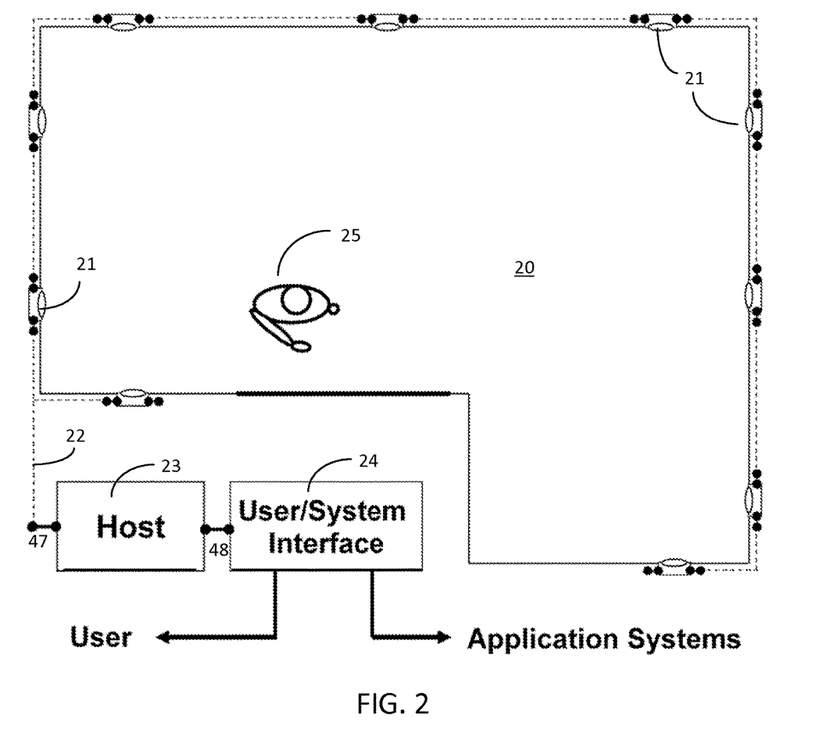
FIG. 2 schematically illustrates a 2D occupancy sensing system according to an embodiment of the present invention.

A 2D occupancy system according to embodiments of the present invention comprises a host device and a plurality of event detection devices. In one example application, the environment is a room, and the event detection devices are located at the wall and/or in the corners of the room. One embodiment is illustrated in FIG. 2, where a room 20 is provided with a sensor network comprising a plurality of event detection devices 21, in the embodiment illustrated 10 event detection devices. The number of event detection devices is not limiting for the present invention, as long as the 2D occupancy system comprises 2 or more event detection devices, the viewing angle of any event detection device of the system overlapping with the viewing angle of any other event detection device of the system. In particular embodiments there may be 2 event detection devices, or three event detection devices, or any other number more than 2. The event detection devices 21 can for example be based on PIR (Passive Infrared Detection) sensors that only indicate presence or motion of users, on optical mice sensors that are able to detect motion and also give direction and size of the motion, or on horizontally placed linesensors that indicate motion in a certain viewing cone if operated in a differential sensing fashion. The room 20 in this embodiment is a non-rectangular room. The event detection devices 21 are spread around the room 20 and are positioned against the walls thereof. The event detection devices 21 are oriented in a manner that enables the event detection devices to observe 'events' (for example motion or local change of temperature) occurring within a range of the event detection device 21. Therefore, the event detection devices 21 look towards the inside of the room 20, e.g. the centre of the room 20. The event detection devices 21 are connected through a network 22 to a host device 23. The number of event detection devices 21 in the network depends on parameters such as the size and shape of the room 20 and the viewing angles of the event detection devices. The event detection devices 21 may be wired or wireless devices, hence the network 22 may be a wired or a wireless network, e.g. a UART or any other fixed or non-fixed message size wired or wireless network such as those adhering to the IEEE 802 standard. Also the host 23 is connected, wired or wirelessly, in the network 22.

It is an advantage that a 2D occupancy system according to embodiments of the present invention have a low cost of installation, meaning no issues with infrastructure. Furthermore, 2D occupancy systems according to embodiments of the present invention have an extremely low power consumption.

Figure 5:
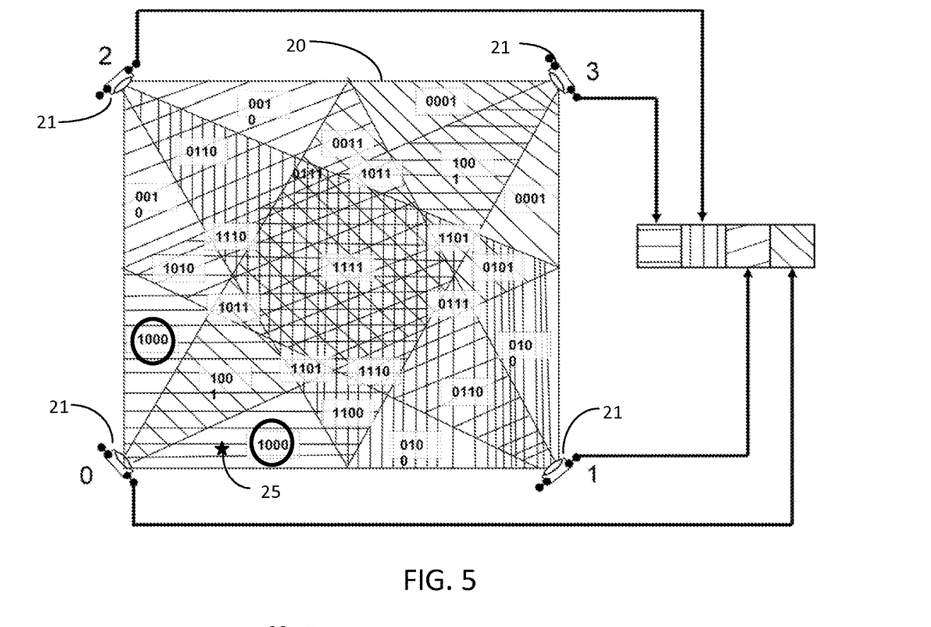
FIG. 5 illustrates a method according to embodiments of the present invention for determining 2D occupancy based on events detected by event detection devices coupled in a sensor network.
Figure 6:
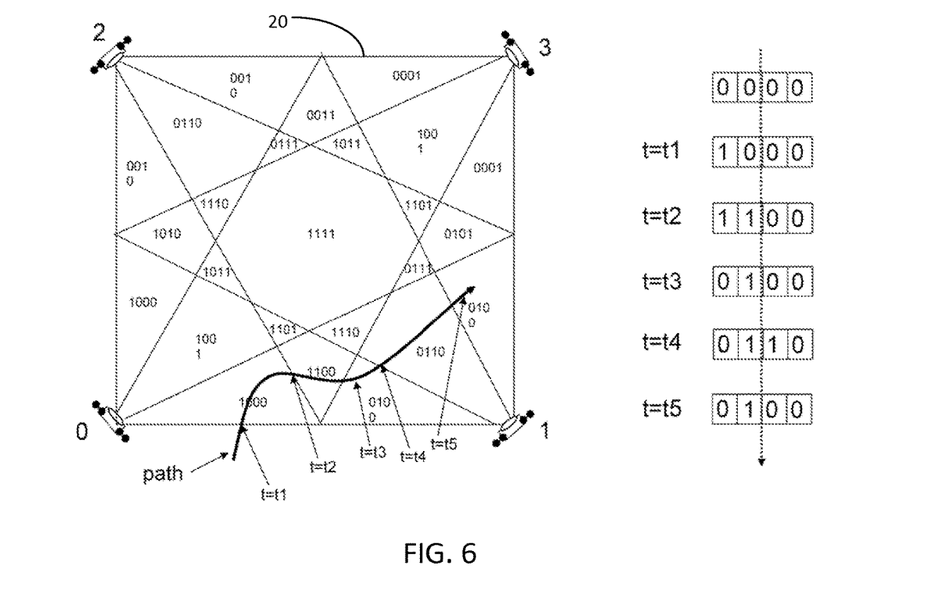
FIG. 6 illustrates a path of a user walking through an environment and the sequence of messages sent to the host.

Each event detection device 21 has a viewing angle. The event detection devices 21 are positioned in the room 20 such that the viewing angle of any event detection device 21 overlaps with the viewing angle of at least one other event detection device 21 in the room. The viewing angles of the different event detection devices 21 in the network 22 can vary and can be different from event detection device to event detection device, depending on the needs of the environment, e.g. room. In FIG. 2, for convenience and clarity of the drawing, the viewing angles of the event detection devices 21 are not illustrated, but in another example as illustrated in FIG. 5 and FIG. 6 they are.

Figure 3:
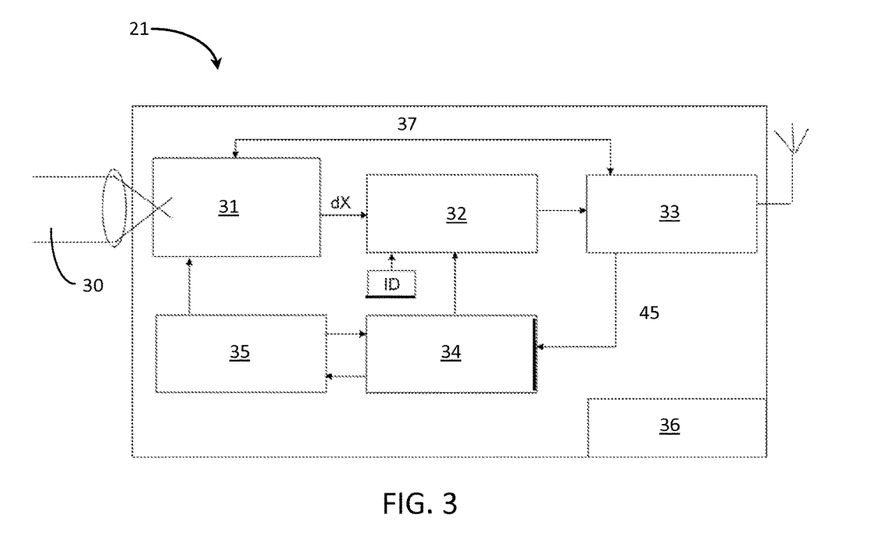
FIG. 3 is a schematic block diagram of an embodiment of an event detection device in the form of a motion detection device architecture which may be used in particular embodiments of the present invention.

An embodiment of an event detection device architecture is illustrated in FIG. 3. The event detection device 21 illustrated is a motion detection device and comprises an optical system 30 such as a lens or pinhole for looking at a scene. Low-resolution frames of less than 4000 pixels captured via the optical system 30 are fed to a motion detector 31 for determining whether or not motion is detected within the viewing angle of the event detection device 21. If motion is detected, a motion signal dX is fed from the motion detector 31 to a data packer 32. In particular embodiments of the present invention, the motion signal may be a binary signal. In alternative embodiments the magnitude and/or direction of the motion can be sent. In case a horizontal line sensor is used as the motion detection device 21, one node can be seen as a plurality of pixel sensors sharing a transceiver node, each of them sensing motion in a particular viewing cone depending on the optical system used. The data packer 32 is adapted for sending to the host 23, via a communication transmitter, the motion signal and an indication of which motion sensor 21 in the network 22 has sensed the motion. The communication transmitter may be, but does not have to be, part of a transceiver 33. The indication of which motion sensor 21 has sensed the motion may be an identification stored in an ID memory within the motion sensor 21.

The motion detection device 21 comprises a control unit 35 for controlling the motion detector 31.

Furthermore, a battery and power control section 36 is provided in the motion detection device 21.

The motion detection device 21 furthermore comprises a receiver for receiving data from the host 23. In the embodiment illustrated in FIG. 3, the receiver forms part of the transceiver 33.

A particular embodiment of a motion detection device which may be used in embodiments of the present invention is a device as described in U.S. Pat. No. 5,786,804, presently only known for its use in optical mice. Such motion detection device comprises a two-dimensional array of photosensors for forming low-resolution frames of 4000 pixels or below, a storage unit connected to said array for storing a reference frame of pixel values in which each pixel value is indicative of light energy received at a particular photosensor at a specific time, correlation means connected to said array and to said storage unit for correlating an arrangement of said pixel values of said reference frame with at least one sample frame of pixel values formed in response to light energy received at said array subsequent to said specific time; and computing means, responsive to detection of correlations by said correlation means, for generating an attitudinal signal representing pitch and yaw of pixel values of said at least one sample frame relative to said pixel values of said reference frame, said attitudinal signal thereby representing movement of the user 25 in the environment 20. Effectively, this is a tiny camera that is able to do fast motion detection and motion estimates based on visual clues (camera view). Output of the device are the low-resolution frame, motion detection, motion vectors and various frame parameters. In embodiments of the present invention, only the motion detection and measurement output of the system are used. Clear benefits of this device are its low price, low power consumption and direct motion vector outputs at high sampling rates. Compared with a regular camera, huge and expensive image processing is not needed. Due to the low image quality (resolution of 4000 pixels or below) provided, e.g. only 30×30 pixels, a guarantee of privacy can be given. Other motion sensor detectors that share the low-power and price benefits but are not even able to capture real images are PIR detectors and the pixels of horizontally placed line sensors. Such detectors may also be used as motion detection devices 21 in embodiments of the present invention.

Figure 12:
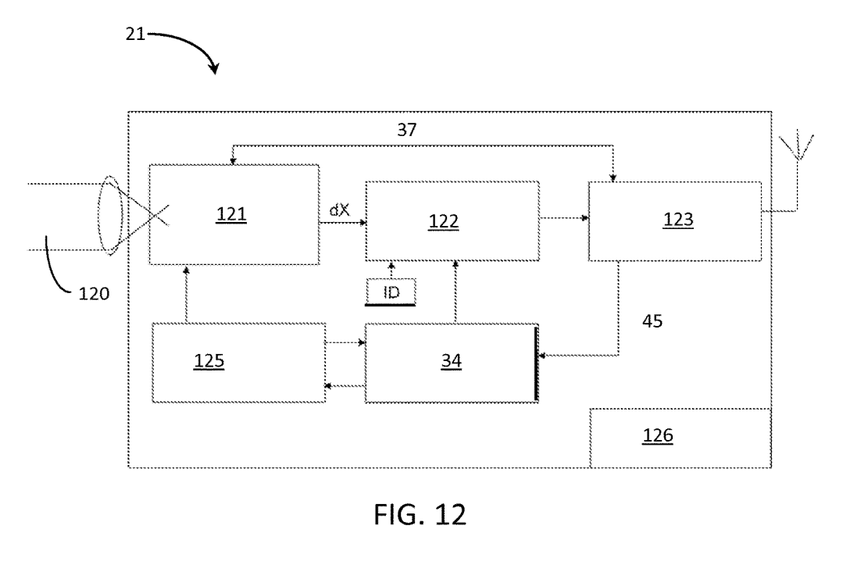
FIG. 12 is a schematic block diagram of an embodiment of an event detection device in the form of a temperature sensing device architecture which may be used in particular embodiments of the present invention.

Another embodiment of an event detection device architecture is a temperature sensing device, an example of which is illustrated in FIG. 12. The event detection device 21 illustrated comprises a sensor face 120 for receiving infrared radiation emitted from the scene looked at. Infrared radiation captured via the sensor face 120 are fed to a temperature change detector 121 for determining whether or not a temperature change is detected within the viewing angle of the event detection device 21. If a temperature change is detected, a temperature change signal dX is fed from the temperature change detector 121 to a data packer 122. In particular embodiments of the present invention, the temperature change signal may be a binary signal. In alternative embodiments the magnitude of the temperature change can also be sent. The data packer 122 is adapted for sending to the host 23, via a communication transmitter, the temperature change signal and an indication of which event sensor 21 in the network 22 has sensed the motion. The communication transmitter may be, but does not have to be, part of a transceiver 123. The indication of which event sensor 21 has sensed the temperature change may be an identification stored in an ID memory within the temperature sensor 21.

The temperature detection device 21 comprises a control unit 125 for controlling the temperature change detector 121.

Furthermore, a battery and power control section 126 are provided in the temperature sensing device 21.

The temperature sensing device 21 furthermore comprises a receiver for receiving data from the host 23. In the embodiment illustrated in FIG. 12, the receiver forms part of the transceiver 123.

Figure 4:
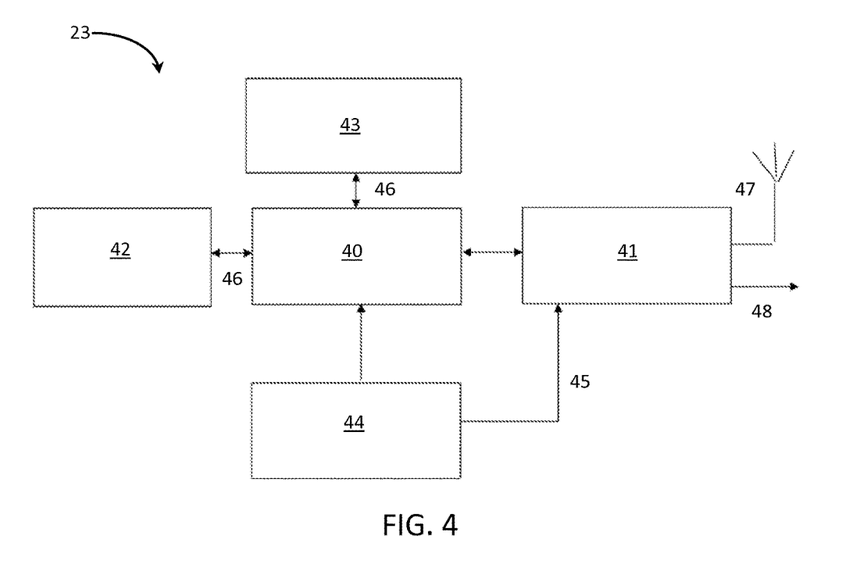
FIG. 4 is a schematic block diagram of a host device architecture which may be used in embodiments of the present invention.

An embodiment of a host architecture is illustrated in FIG. 4. The heart of the host 23 is a processing unit 40, for example a microprocessor. The processing unit 40 may refer to any device or portion of a device that processes electronic data to transform that electronic data into other electronic data, the processed data. The processing unit 40 is adapted for executing operating system and application programs that implement a 2D occupancy determining method according to embodiments of the present invention, as described in greater detail below with reference to FIGS. 5 to 8.

The processing unit 40 is adapted for receiving event data from the plurality of event detection devices 21. Such event data is received via a receiver which forms part of the host 23. In particularly advantageous embodiments, the receiver may form part of a communication transceiver 41. Combining a transmitter and a receiver allows to have a smaller device by sharing common circuitry, compared to a host 23 which would have a separate transmitter and receiver.

The host 23 furthermore comprises a first memory 42 for storing an algorithm for determining a position of a user of which movement is sensed in the environment of which low-resolution frames are captured by the event detection devices 21.

The host 23 may furthermore comprise a second memory 43 for storing data related to the event detection devices 21 in the network 22. The data related to the event detection devices may be data related to identification of the event detection devices, for example identification numbers as stored in the ID memory of the event detection devices 21, and a position of these event detection devices in the network 22.

The host is provided with a first connection 47 for connecting to the network 22 comprising the pool of event detection devices 21, and with a second connection 48 for connecting to a user and/or system interface 24.

In embodiments of the present invention, the host 23 may furthermore comprise a clock, for example a real-time clock 44. Such clock 44 may provide a clock signal which is applied to the processing unit 40. A clock synchronization signal, for example a real-time clock synchronization signal 45 may be sent to the event detection devices 21 via the transmitter of the host 23, which transmitter may form part of the transceiver 41. Also the event detection device 21 comprises a clock, e.g. a real-time clock 34. The real-time clock 34 of the event detection device 21 may be adapted for being synchronized with the real-time clock 44 of the host 23 by means of the clock synchronization signal 45 received from the host 23. An internal clock signal from the clock 34 may be applied to the control unit 35, 125 in order to activate a measurement and transmission.

When desired, the host 23 can alter the settings of the event detection device 21, for example the settings of the motion detector 31 or temperature change detector 121, e.g. via a link 37 between the communication receiver, e.g. transceiver 33, and the motion detector 31 or temperature change detector 121.

In particular embodiments of the present invention, the event detection devices 21 have an extremely low resolution. The minimal resolution may be one pixel, read-out in a differential way of e.g. a horizontally placed line sensor or for example 2 or 4 pixels in a PIR sensor. For example in embodiments of the present invention, the event detection devices 21 can be devices as described in U.S. Pat. No. 5,786,804, having a two-dimensional array of photosensors used to form a reference low-resolution frame and a sample low-resolution frame, whereby the fields of view of the sample and reference low-resolution frames largely overlap, so that there are common imaged features from frame to frame. Sample frames are correlated with the reference frame to detect differences in location of the common features. Based upon detection of correlations of features, an attitudinal signal indicative of pitch, yaw and/or roll is generated. In alternative embodiments, the event detection devices 21 can only detect and report events (e.g. motion detected, temperature change detected) using a single bit in the case of PIR sensors and pixels of line sensors. Optical mouse sensors can also give single bits indicating motion but are also able to give the direction and size of the motion. In particular embodiments, logical 0 indicates no event or thus no presence and/or no motion detected, and logical 1 indicates a detected event, hence presence and/or motion detected. Thus the event is simply a Boolean event. Auxiliary information about direction of motion, velocity and identity of the detected user may be used but is not required for particular embodiments of the present invention.

A 2D occupancy system according to embodiments of the present invention may furthermore comprise a user or system interface 24 for, for example, displaying the 2D occupancy map or coordinates of moving users such as persons, animals or objects in the environment. In embodiments of the present invention, the user or system interface 24 may be for forwarding the measurements to an application system such as for example a surveillance or elderly system that could generate an alarm or build up statistical data for an environment discovery system or a building control system that can activate or deactivate lights, ventilation and heating systems and open or close doors.

FIG. 5 illustrates an embodiment of a method according to the present invention for automatically determining 2D occupancy based on events (presence or motion of users) detected by event detection devices 21, in this embodiment motion detection devices, coupled in a sensor network 22. The environment in this embodiment is a rectangular room 20. The room 20 is provided with a visual sensor network 22 comprising a plurality of motion detection devices 21 and a host 23 (not illustrated in FIG. 5). In the embodiment illustrated, the motion detection devices 21 are located in the corners of the room 20. The motion detection devices 21 each have a viewing cone, spanning preferably about half of the space of the environment 20. A viewing cone of about half of the space of the environment 20 is optimal in information theoretic sense, nevertheless in accordance with embodiments of the present invention also other viewing cones are permitted. The position and viewing angles of each motion detection device 21 are known a priori by the host 23, for example by storing this information in the second memory 43. All motion detection devices 21 are synchronized to a similar clock, for instance the clock 44 generated by the host 23.

Events (motion) occurring within the environment, room 20, under inspection of the motion detection devices 21 are detected by such motion detection devices 20. The downwards projected viewing cones of the motion detection devices 21 divide the observed environment 20 into regions, e.g. polygonal regions, that are addressable based on two observation cases: motion is detected in that region yes "1" or no "0" for each of the motion detection devices 21.

A motion detection device 21 (as illustrated in detail in FIG. 3 and described hereinabove with respect thereto) views its viewing cone using an optical system 30 such as a lens or a pinhole and measures the presence of motion by means of a motion detector 31 when indicated by a control unit 35. The same control unit 35 asks the current time given by an on-board real-time clock 34 and together with the motion detection device identification (ID) the motion measurement and time-stamp are broadcast on the network via a transmitter which may form part of the transceiver 33. Each event broadcast on the network is thus labeled according to the detecting sensor ID and the time t of the event.

While each motion detection device 21 measures the presence of motion within its viewing cone (indicating one or more moving persons 25 or objects in its viewing cone) and reports present or not present together with its ID and a time-stamp on the network 22, the host 23 (as illustrated in detail in FIG. 4 and described hereinabove with respect thereto) receives all the messages under the form of labeled events. The labeled events are stored in a memory of the host 23, for example first memory 42, storing a list of detected events. The event list is in a form of E(ID, t). In particular embodiments, advantageous as it saves memory space, an entry appears in the event list if and only if a motion event is detected by a sensor at time t. It is to be noted that in the described embodiment the events are Boolean, and indicated merely the presence of some kind of motion anywhere within the range of the sensor with no indication of the number of users, identities of the users, nor direction or velocity of the motion, or any other secondary information. In other embodiments, depending on the type of sensor used, the direction and or size of motion could be transmitted to the host. The present embodiment with binary sensors is chosen based on its low-price and simplicity of the sensors and the low amount of data to be transmitted on the network.

Labeled events at any time t are grouped, and from this grouping presence information is determined.

Based on the grouping of labeled events, obtained from successive observations from all motion detection devices 21, and using a theory of possible and plausible paths, the host 23 by means of its processing unit 40 may deduct the track of the person 25 moving through the environment 20. This way, the correct line and position can be identified and the trajectory of the person 25 through the environment 20 can be drawn. The host 23 may then report the current position of person(s) 25 to an application via the system interface 24. In alternative embodiments, the current position of person(s) 25 may be reported to a user, e.g. presented on a display via a user interface 24.

The host 23 has the master real-time clock 44 and is built around a processing unit 40, e.g. a micro controller, a working memory 42 and a communications engine 41. In particular embodiments of the present invention, the host 23 also has all information available about the position and IDs of the motion detection devices 21, for example stored in a second memory 43. Alternatively, the motion detection devices 21 can store their own position and viewing angles in the space and broadcast this to the host 23, thereby possibly avoiding the ID transmission. They may therefore be provided with a memory (not illustrated in FIG. 3).

As an example, for determining position and optionally track of a user 25 moving through an environment 20, all motion detection devices 21 that observe the environment may actually build up a 2D indexed and labeled map (FIG. 5). The downwards projected viewing cones of the motion detection devices 21 may divide the observed environment 20 into regions, e.g. polygonal regions, that are addressable based on two observation cases: motion is detected in that region yes "1" or no "0" for each of the motion detection devices 21. The combination of the observations and non-observations from all motion detection devices 21 at a given timestamp gives an address corresponding to one or more polygons in the environment 20.

The address of a moving user 25 on one time-stamp t is obtained using the following formula:

$$\text{address} = \Sigma_i \text{ observation}(i) \times \#\text{cases}^i,$$

where i is the number of the motion detection device 21 (sequentially ordered from 0 upwards), observation(i) is the observation that the $i^{th}$ motion detection device 21 made, cases is the number of different observations that a motion detection device 21 can do; in particular embodiments of the present invention, a motion detection device can do only two observations: "0" for no movement detection and "1" for detection.

If at a timestamp t a user 25 is present in the environment 20 at a location as indicated in FIG. 5, it is clear that the user 25 moves within the viewing cone of motion detection device 3, but outside the viewing cones of motion detection devices 0, 1 and 2. Hence, at timestamp t motion detection device 3 will send a detect "yes" signal to the host 23, and motion detection devices 0, 1 and 2 will (depending on the set-up of the system) either send a detect "no" signal to the host 23, or will send no signal at all. Hence the address generated by the movement of user 25 within the environment 20 is 1000.

If the observations that construct one address have slightly different timestamps because of clock drift in the motion detection devices 21, the timestamps can be averaged by the host 23 in order to derive an estimated timestamp. Drift in the motion detection device clocks 34 can indicate that the host 23 has to start a synchronization procedure (using techniques such as the one known to a person skilled in the art of wireless sensor networks, such as for example described in US2009/316624).

As can be seen from FIG. 5, several polygons can have equal addresses. In case of the above example, there are two polygons which lie within the downwards projected viewing cone of motion detection devices 0 only and hence generate the address 1000. The correct polygon where the user 25 is moving is found by paying special attention to migration of the user 25 from one polygon to the other, as illustrated in FIG. 6. During this migration subsequent observations are generated:

1/ the address of the first polygon (e.g. 1000 in the example given),

2/ an address of the OR of the first and second polygon (e.g. 1000 OR 1100), and then 3/ the address of the third polygon (e.g. 0100), etc.

Because the user 25 is crossing only a single vertex in the observation space, only one entry (bit) in the address will change. Crossing any boundary will only flip one bit in the address space. If one would cross multiple boundaries at the same time, (at boundary junctions) the observation will always be an OR of all attached regions, being the address of one of the touching regions, so the observation will not lead astray.

In the example illustrated above, the user 25 in its initial position is present in a polygon with address 1000, which can be any of two polygons as illustrated in FIG. 5. While moving through the environment 20, the user migrates from the polygon with address 1000 to a polygon with address 1100, as detected by the four movement detection devices 21 placed in the four corners of the environment 20. Two observations are generated: first "1000", and upon crossing the boundary with the neighboring polygon the address "1100"

If measurements are performed by the motion detection devices 21 at predetermined times t=1, t=2, t=3 etc., then at particular moments in time detection results will change, hence other addresses will be generated at these particular moments. For the example illustrated in FIG. 6, before the user 25 enters the environment 20, none of the motion detection devices detects any motion, hence the address generated is 0000. As from t=t1, when the user 25 enters the environment 20, the address generated is 1000. As from moment t=t2, the user 25 is detected by motion detection devices 2 and 3, and the address generated is 1100. As from moment t=t3, the user 25 is detected by motion detection device 2 only, and the address generated is 0100. As from moment t=t4, the user 25 is detected by motion detection device 1 and 2, and the address generated is 0110. As from moment t=t5, the user 25 is detected by motion detection device 2 only, and the address generated is 0100. The path of the user 25 walking through the environment 20 will generate the sequence of messages shown at the right hand side of FIG. 6 and send these to the host 23.

It is to be noted that events occur later around t=t3 and t=t5 because of a non-zero size of the user 25. Effectively, measurements are OR-ed.

Figure 7:
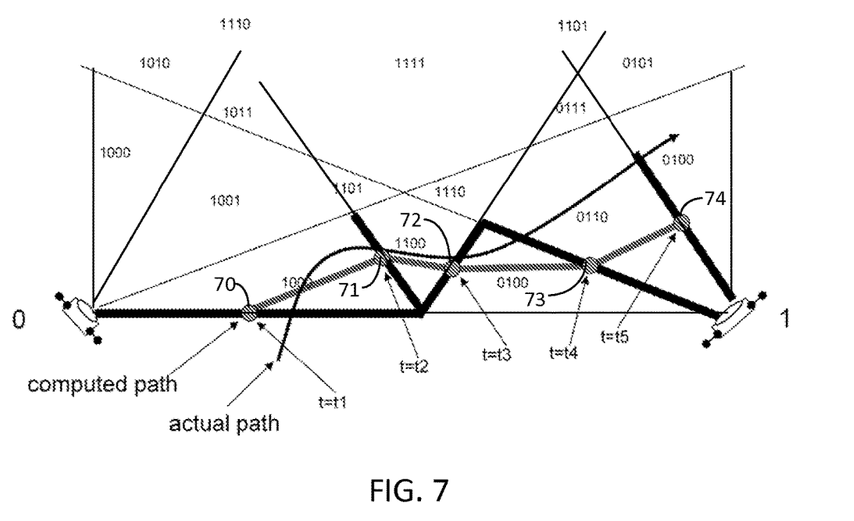
FIG. 7 illustrates an actual path of a user through the environment and a corresponding reconstructed path as determined by a 2D occupancy sensing system according to embodiments of the present invention.

The subsequent order of observations will finally remove any ambiguities of where the user 25 is moving in the environment 20 (see FIG. 7). Based on the observations, the path (trajectory) of the user 25 is reconstructed by a path going through the centers of the line-pieces of adjoining detected regions. At least three events are collected before deciding for the line-pieces in order to avoid ambiguities. While earlier an address could be linked to several polygons in the space, migrations and the knowledge of which regions are connected will lead to a correct position. In effect, only the observations when the person migrates from one region to the other are placed correctly on the time-stamp. The original timestamps are placed on crossing the line-pieces. Still it is not possible to accurately place the persons on the vertex. But the exact line-piece is now known and the position is assumed to be the center of the line-piece.

Figure 8:
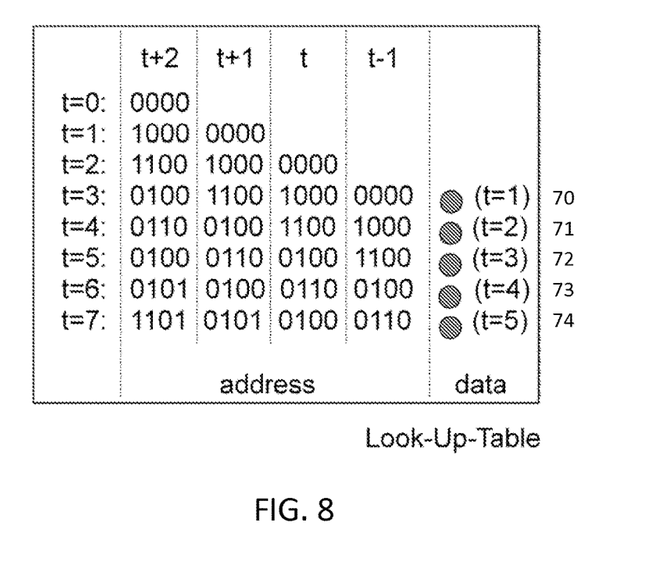
FIG. 8 shows a LUT that is constructed in a method for 2D occupancy sensing according to embodiments of the present invention, the illustrated LUT values corresponding to the trajectory illustrated in FIG. 7.

An easy way without computation to derive the center coordinates of the line-piece (the estimated location of the user 25) using subsequent observation is by concatenating the observations and using it as an address for a look-up-table (LUT) (FIG. 8). An embodiment with a LUT is the best embodiment known in the sense of simplicity and minimal computation. Nevertheless, a LUT can take a lot of memory in situations with many motion detection devices 21, in which case a deduction method with a state-machine or vision graph based methods may be used, which require more processing power but are less memory intensive.

The addresses of the LUT are an augmented order of all possible subsequent event observations. The output of the LUT comprises position coordinates (e.g. x, y position) of the middle of line-pieces of adjoining detection regions in function of concatenated polygon addresses. In the embodiment illustrated, three migrations, (four addresses) are concatenated to remove any ambiguities in the path of the user 25. The x and y coordinates of the center points of the line-pieces of adjoining detection regions correspond to estimated positions of the moving user 25 (object or person).

In the particular embodiment illustrated, the output of the LUT gives the location co-ordinates of the middle of the line-piece that was crossed two observations ago. Hence if in the LUT at t=t6 for example an address 0101 0100 0110 0100 is entered, the output of the LUT is position 73 which was reached at t=t4, as illustrated in FIG. 7.

The number of concatenated polygon addresses in the LUT depends on the number and configuration of motion estimation devices present in the environment 20.

Other implementations for determining an estimated path corresponding to the actual path of the user 25 can be made using a state-machine or by direct computation. While the look-up-table and state machine are easily configurable and need less active computation, a direct computation method uses more computing power but less memory.

Improvements of the estimate of the path of the user 25, e.g. person, animal or object, can be made by one or more of using a physical body model that minimizes changes in acceleration, or concentrating the path along the shortest possible path between the two coordinates, or taking into account the amount of time spent in a region. Also additional information from more intelligent sensors such as for example motion direction and/or magnitude can be used to improve the path.

Figure 9:
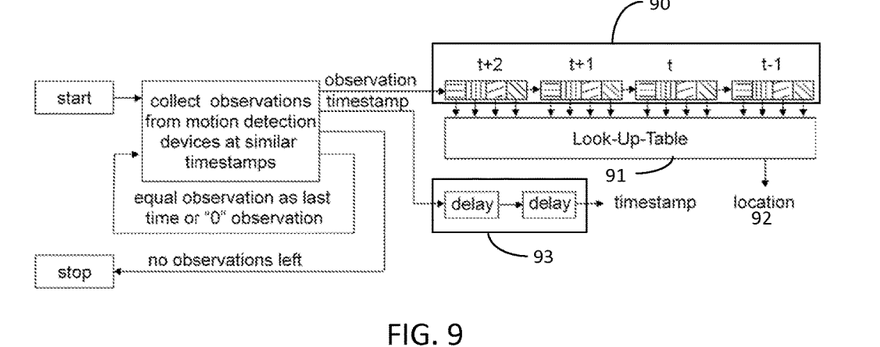
FIG. 9 illustrates how a host observes new observations from the event detection devices and groups them according to timestamps, in accordance with embodiments of the present invention.

The look-up-table flow of processing is shown in FIG. 9. In embodiments of the present invention, this process can run on the host processing unit 40, e.g. micro-processor.

The host 23 collects observations (events) from the motion detection devices 21 in the network 22 and groups them according to timestamps. In particular embodiments the host 23 may find either changes in address, which means that the user 25 (person or object) is crossing a vertex, or a similar grouped observation as the previous one indicating that the user 25 is still in the same polygon. In particular embodiments, a grouped observation of zeroes also means that the user 25 is still in the same polygon and not moving at all, or that there is no user 25 in the environment 20. If the grouped observation is equal to last time, there is no event, and the next observations are awaited.

Valid (changing and non-zero) grouped observations are pushed into a shift register 90. The shift register 90 can hold as many addresses as needed in order to remove ambiguity. In the example which was illustrated above, the shift register 90 holds four addresses. With an event, the observation is clocked into the address register of the LUT 90. Hence the contents of the shift register 90 are used as address to the look-up-table 91 which has as output 92 the estimated position of the moving user 25, for example under the form of location parameters, e.g. x, y parameters in the environment. The time-stamp of the observations are delayed using a similar shift-register 93 in order to match up with the estimated position that is generated by the look-up-table 91. Finally, the estimated position and time-stamp may be forwarded to an application, such as for example displaying the 2D occupancy map or coordinates of moving persons, animals or objects in the environment and/or forwarding the measurements to an application system such as a surveillance or elderly care system that could generate an alarm or build up statistical data for an environment discovery system or a building control system that can activate or deactivate lights, ventilation and heating systems and open or close doors.

In the above embodiments, the change detection (or event detection) is performed in the host 23. In alternative embodiments, it can also be performed in the motion detection devices 21 by only transmitting an observation if a change in observation occurs or only if motion is detected. In this case the host 23 stores the previous state of the network 22 and reacts to any received signal indicating a change of one of the motion detection device entries in the environment. Subsequent processing is similar.

It is to be pointed out that in the above description the process of determining 2D occupancy of a user in an environment is explained based on use of motion detection devices. This, however, is not intended to be limiting for the invention. Similar method steps can be applied in case of use of other event detection devices, such as for example temperature sensing devices, but these method steps are not explained here in detail again in view of their similarity with the above-explained steps.

Figure 10:
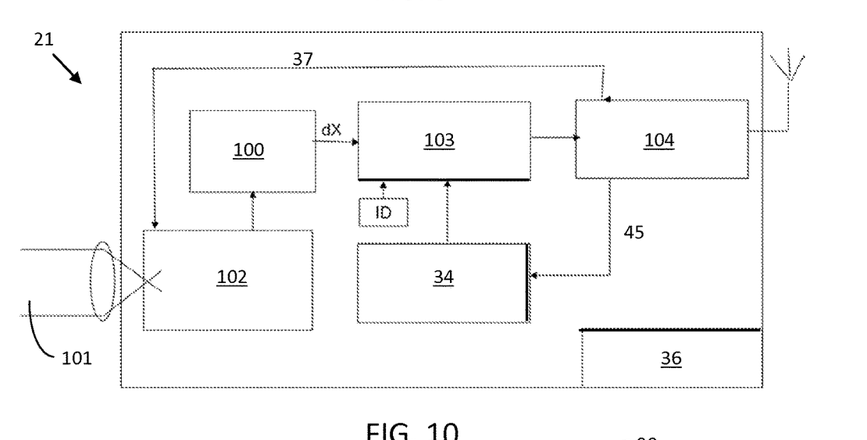
FIG. 10 is a schematic block diagram of an alternative embodiment of an event detection device architecture which may be used in embodiments of the present invention.

An alternative embodiment of an event detection device architecture is illustrated in FIG. 10. The event detection device 21 comprises a sensor interface 101 for looking at and receiving event information from a scene. Low-resolution frames captured via the sensor interface are fed to an observation detector 102. An event detector 100 determines, based on the low-resolution frames received by the sensor interface 101, whether or not an event is detected within the viewing angle of the event detection device 21. If an event is detected, an event detection signal dX is fed from the event detector 100 to a data packer 103. In particular embodiments of the present invention, the event detection signal may be a binary signal. In alternative embodiments the magnitude and/or direction of the event can also be sent. In case a horizontal line sensor is used as the event detection device 21, one node can be seen as a plurality of pixel sensors sharing a transceiver node, each of them sensing an event in a particular viewing cone depending on the optical system used. The data packer 103 is adapted for sending to the host 23, via a communication transmitter, the event detection signal and an indication of which event detection device 21 in the network 22 has sensed the event. The communication transmitter may be, but does not have to be, part of a transceiver 104. The indication of which event detection device 21 has sensed the event may be an identification stored in an ID memory within the event detection device 21.

In such embodiments, an event is caused only by a change in observation. This means that an event detection device 21 which previously sensed an event, e.g. presence, but now does not sense the event, e.g. presence, anymore sends a message to the host 23, while an event detection device 21 which previously did sense an event, e.g. presence, and still does, does not send any message to the host 23. Such embodiments minimize the amount of information sent through the network 22 to the host 23. Now the "event" detection is performed inside the event detection device. Alternatively, event detection devices can send signals at regular intervals if such events are is detected.

Figure 11:
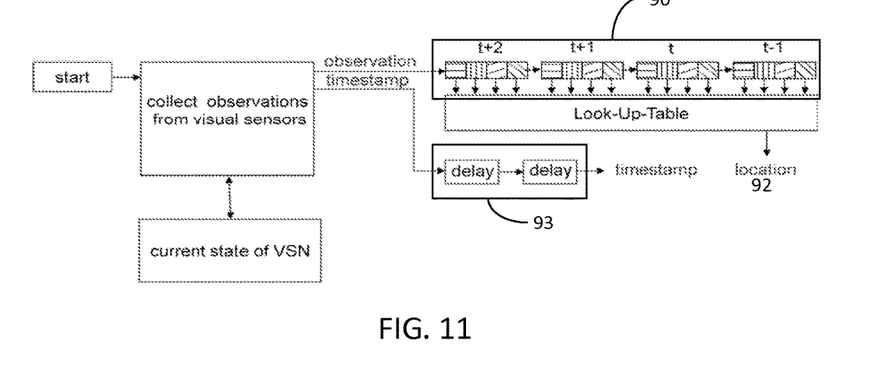
FIG. 11 illustrates how a host observes new observations from the event detection devices and groups them, in accordance with alternative embodiments of the present invention.

A corresponding processing flow is illustrated in FIG. 11. In embodiments of the present invention, this process can run on the host processing unit 40, e.g. micro-processor.

Now the host 23 collects events from the event detection devices 21 in the network 22 and groups them. The events collected in these embodiments are changes in observations as detected by the event detection devices 21.

Valid (hence changing and non-zero) grouped observations are pushed into a shift register 90. The shift register 90 can hold as many addresses as needed in order to remove ambiguity. In the example which was illustrated above with respect to the first embodiment, the shift register 90 holds four addresses. With an event, the grouped observation is clocked into the address register of the LUT 90. Hence the contents of the shift register 90 are used as address to the look-up-table 91 which has as output 92 the estimated position of the moving user 25, for example under the form of location parameters, e.g. x, y parameters in the environment. The time-stamp of the observations are delayed using a similar shift-register 93 in order to match up with the estimated position that is generated by the look-up-table 91. Finally, the estimated position and time-stamp may be forwarded to an application, such as for example displaying the 2D occupancy map or coordinates of moving persons, animals or objects in the environment and/or forwarding the measurements to an application system such as a surveillance or elderly system that could generate an alarm or build up statistical data for an environment discovery system or a building control system that can activate or deactivate lights, ventilation and heating systems and open or close doors.

In practice, doing event detection on the event detection devices 21 itself is probably more error prone than looking at the state of the network 22 at regular time intervals. Most wireless networks 22 have anyway messages at regular time intervals in order to keep the communication channels valid. In accordance with embodiments of the present invention these can be used for the purpose of sending measurements to the host 23.

A 2D occupancy system according to embodiments of the present invention, based on a (optionally wireless) network of event detection devices 21 and a host 23 that are collaborating in a network 22, may be used for generating an occupancy map, illustrating where one or more users 25 are present in an environment 20, and how they migrate through this environment 20.

A 2D occupancy system according to embodiments of the present invention can be subsequently used as an environment discovery system. Based on longer and multiple observations it can determine passages such as doors, and obstacles such as tables, chairs and interesting positions in the environment, e.g. room (eg. near spots at the walls). Such passages and obstacles may be determined based on reasoning supported by the 2D occupancy flows, e.g. because a user 25 always enters or leaves the environment by crossing a particular line-piece, or because a particular polygon is never entered by a user 25. Passages and obstacles may subsequently be indicated in a 2D occupancy plan. This plan can be used for HVAC and lighting control, surveillance applications and/or elderly care.

The methodologies described herein are, in particular embodiments, performable by a machine, e.g. host 23, which includes one or more processors, e.g. processing unit 40, that accept computer-readable (also called machine-readable) code containing instructions. For the methods described herein, when the instructions are executed by the host 23, the host 23 performs the method. Any machine capable of executing a set of instructions (sequential or otherwise) that specify actions to be taken by that machine are included under the definition of host 23. Thus, a typical host 23 may be exemplified by a typical processing system that includes one or more processing units 40. Each processing unit 40 may include one or more of a CPU, a graphics processing unit, and a programmable DSP unit. The processing unit 40 further may include a memory subsystem 42, 43 including main RAM and/or a static RAM, and/or ROM. The term memory subsystem as used herein also encompasses a storage system such as a disk drive unit. The memory subsystem thus includes a carrier medium that carries computer-readable code (e.g., software) including instructions for performing, when executed by the processing unit 40, one of more of the methods for determining 2D occupancy as described herein. It is to be noted that when the method includes several elements, e.g., several steps, no ordering of such elements is implied, unless specifically stated. The software may reside in the hard disk, or may also reside, completely or at least partially, within the RAM and/or ROM and/or within the processing unit 40 during execution thereof by the host. Thus, the memory 42, 43 and the processing unit 40 also constitute carrier medium carrying computer-readable code. A bus subsystem 46 may be included for communicating between the components.

If the application requires a display, such a display may be included (not illustrated in the drawings), e.g., a liquid crystal display (LCD) or a cathode ray tube (CRT) display. If manual data entry is required, the host 23 also includes an input device such as one or more of an alphanumeric input unit such as a keyboard, a pointing control device such as a mouse, and so forth. The host 23 in some configurations may include a sounds output device (not illustrated in the drawings), for example for alerting when a user 25 enters a forbidden zone, and a network interface device.

The host 23 may be a personal computer (PC), a tablet PC, a set-top box (STB), a Personal Digital Assistant (PDA), a web appliance, a network router, switch or bridge, or any machine capable of executing a set of instructions (sequential or otherwise) that specify actions to be taken by that machine.

It is to be noted that while the diagram of FIG. 4 only shows a single processing unit 40 and a single memory 42 that carries the computer-readable code, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processing units that are part of a 2D occupancy system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable code for controlling a processing unit to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via the network interface device. While the carrier medium may be indicated in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire, fiber optics and antennas, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

While the invention has been illustrated and described in detail in the drawings and foregoing description, such illustration and description are to be considered illustrative or exemplary and not restrictive. The invention is not limited to the disclosed embodiments but is only limited to the matter of the appended claims.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A 2D occupancy system for determining a position of a user in an environment, the system comprising:
  a host device and a plurality of event detection devices connected through a network, at least one of the plurality of event detection devices comprising a low resolution detection device with a resolution of about 4000 pixels in total or below,
  each event detection device having a viewing angle, wherein parts of the environment covered by the viewing angle of a single event detection device and parts of the environment defined by an overlap of the viewing angle of any event detection device with a viewing angle of at least one other event detection device form a plurality of polygons in the environment, the host device comprising an input port configured to receive event information related to presence of users in the plurality of polygons in the environment from the plurality of event detection devices, and
  a processing unit that determines the position of the user in the plurality of polygons in the environment from the event information from particular event detection devices at a same time-stamp,
wherein an event detection device comprises an array of photosensors, a storage unit connected to said array for storing a reference frame of pixel values in which each pixel value is indicative of light energy received at a particular photosensor at a specific time, a correlation device connected to said array and to said storage unit that correlates an arrangement of said pixel values of said reference frame with at least one sample frame of pixel values formed in response to light energy received at said array subsequent to said specific time, and a computer, responsive to detection of correlations by said correlation device to generate an attitudinal signal representing optical flow of pixel values of said at least one sample frame relative to said pixel values of said reference frame, said attitudinal signal thereby representing a direction and/or size of movement of the user in the plurality of polygons in the environment.

2. The 2D occupancy system according to claim 1, wherein at least one of the plurality of event detection devices is configured to deliver an event detection signal to the host device.

3. The 2D occupancy system according to claim 1, wherein the processing unit is configured to determine a track of moving users by analyzing a migration of the event information from the plurality of event detection devices.

4. The 2D occupancy system according to claim 1, wherein the network is wired.

5. The 2D occupancy system according to claim 1, wherein the network is wireless.

6. The 2D occupancy system according to claim 1, wherein the network includes wired and wireless event detection devices.

7. A method for determining 2D occupancy of an environment by a user, comprising the steps of:
detecting an event related to presence of a user in the environment by at least one of a plurality of event detection devices, at least one of the plurality of event detection devices being a low resolution detection device with a resolution of about 4000 pixels in total or below, each event detection device having a viewing angle, wherein parts of the environment covered by the viewing angle of a single event detection device and parts of the environment defined by an overlap of the viewing angle of any event detection device with a viewing angle of at least one other event detection device form a plurality of polygons in the environment,
labeling the event according to each event detection device that detected the event and the time of the event, and
determining the position of the user in the plurality of polygons in the environment from the labeled event,
wherein an event detection device comprises an array of photosensors, a storage unit connected to said array for storing a reference frame of pixel values in which each pixel value is indicative of light energy received at a particular photosensor at a specific time, a correlation device connected to said array and to said storage unit that correlates an arrangement of said pixel values of said reference frame with at least one sample frame of pixel values formed in response to light energy received at said array subsequent to said specific time, and a computer, responsive to detection of correlations by said correlation device to generate an attitudinal signal representing optical flow of pixel values of said at least one sample frame relative to said pixel values of said reference frame, said attitudinal signal thereby representing a direction and/or size of movement of the user in the plurality of polygons in the environment.

8. The method according to claim 7, wherein determining the position of the user in the environment from the labeled events comprises grouping labeled events having a similar timestamp corresponding to the time of the event, and using such group of labeled events as an address on a 2D overview of the environment.

9. The method according to claim 7, comprising determining a track of a moving user by analyzing a migration of motion observations by different motion sensing devices.

10. The method according to claim 9, each of the event detection devices having a viewing cone spanning part of the environment, the viewing cones of the event detection devices dividing the observed environment into regions, wherein determining the position of the user in the environment comprises determining vertex crossing between regions.

11. The method according to claim 10, wherein determining vertex crossing between regions includes using a look-up table relating addresses of regions to position coordinates in the environment.

12. A non-transitory machine readable data storage storing a computer program product comprising instructions for executing the method of claim 7, when executed on a computing device associated with a 2D occupancy system.

* * * * *